*(12)* United States Patent
Bae et al.

(10) Patent No.: US 7,584,292 B2
(45) Date of Patent: Sep. 1, 2009

(54) HIERARCHICAL SYSTEM CONFIGURATION METHOD AND INTEGRATED SCHEDULING METHOD TO PROVIDE MULTIMEDIA STREAMING SERVICE ON TWO-LEVEL DOUBLE CLUSTER SYSTEM

(75) Inventors: Seung Jo Bae, Daejeon (KR); Jin Mee Kim, Daejeon (KR); Seung Hyub Jeon, Jeju-Do (KR); Hag Young Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 752 days.

(21) Appl. No.: 11/290,073

(22) Filed: Nov. 30, 2005

(65) Prior Publication Data

US 2006/0168156 A1 Jul. 27, 2006

(30) Foreign Application Priority Data

Dec. 6, 2004 (KR) .................... 10-2004-0101874

(51) Int. Cl.
*G06F 15/16* (2006.01)
(52) U.S. Cl. .................. 709/231; 709/200; 709/232; 709/220; 707/9
(58) Field of Classification Search .................. 709/231
See application file for complete search history.

(56) References Cited

U.S. PATENT DOCUMENTS

| 5,179,702 | A | * | 1/1993 | Spix et al. .................... 718/102 |
| 5,644,766 | A | * | 7/1997 | Coy et al. .................... 707/204 |
| 6,195,676 | B1 | * | 2/2001 | Spix et al. .................... 718/107 |
| 6,839,895 | B1 | * | 1/2005 | Ju et al. .................... 717/159 |

(Continued)

FOREIGN PATENT DOCUMENTS

KR 2000 0012756 3/2000

(Continued)

OTHER PUBLICATIONS

Jose Luis Pino, Hierarchical Static Scheduling of Dataflow Graphs onto Multiple Processors, 1995.*

(Continued)

*Primary Examiner*—Firmin Backer
*Assistant Examiner*—Arvin Eskandarnia
(74) *Attorney, Agent, or Firm*—Ladas & Parry LLP

(57) ABSTRACT

A hierarchical system configuration method and an integrated scheduling method for offering a multimedia streaming service on a two-level double cluster system are provided. The hierarchical system configuration method includes the steps of: determining whether one server node exists; if one server node exists, determining whether one virtual server node/specific network storing and merging block exists; and if one virtual server node/specific network storing and merging block exists, setting a system configuration mode for configuring a single virtual server node based multimedia streaming server system and determining a representative network address of a current system, wherein depending on a scale and a characteristic of the multimedia streaming service, a hierarchical multimedia streaming server system is configured into a single virtual server node based system, which is a minimum-scale, a mono-level single virtual cluster based system, which is a medium-scale, and a two-level double cluster based system, which is a maximum-scale.

13 Claims, 14 Drawing Sheets

U.S. PATENT DOCUMENTS

| | | | |
|---|---|---|---|
| 7,227,841 B2* | 6/2007 | Mullendore et al. | 370/230 |
| 2003/0002633 A1* | 1/2003 | Kredo et al. | 379/88.08 |
| 2003/0018726 A1* | 1/2003 | Low et al. | 709/206 |
| 2003/0026205 A1* | 2/2003 | Mullendore et al. | 370/230 |
| 2003/0026206 A1* | 2/2003 | Mullendore et al. | 370/230 |
| 2003/0225938 A1* | 12/2003 | Glasco et al. | 709/400 |
| 2005/0107127 A1* | 5/2005 | Moriya | 455/566 |
| 2005/0163379 A1* | 7/2005 | Zimmermann | 382/190 |
| 2005/0278439 A1* | 12/2005 | Cherkasova | 709/223 |
| 2006/0085515 A1* | 4/2006 | Kurtz et al. | 709/207 |
| 2007/0055826 A1* | 3/2007 | Morton et al. | 711/141 |
| 2008/0065468 A1* | 3/2008 | Berg et al. | 705/10 |

FOREIGN PATENT DOCUMENTS

KR    2002 0030952    4/2002

OTHER PUBLICATIONS

P.R. Panda, Data and Memory Optimization Technques for Embedded System, Synopsys Inc., 2001.*

'A study of distributing the load of the LVS clustering system based on the dynamic weight' Kim et al., Korea Information Processing Society Papers A, vol. 8-A, No. 4, Dec. 2001, pp. 299-310.

* cited by examiner

HIERARCHICAL SYSTEM CONFIGURATION METHOD AND INTEGRATED SCHEDULING METHOD TO PROVIDE MULTIMEDIA STREAMING SERVICE ON TWO-LEVEL DOUBLE CLUSTER SYSTEM

BACKGROUND OF THE INVENTION

1. Field of the Invention

The present invention relates to a hierarchical system configuration method and an integrated scheduling method to provide a multimedia streaming service on a two-level double cluster system, and more particularly, to a hierarchical system configuration method and an integrated scheduling method to provide a multimedia streaming service on a two-level double cluster system, which can configure hierarchically various system types depending on a size and a characteristic of the multimedia streaming service and provide a high-performance and high-efficiency multimedia streaming service regardless of a system configuration by: constructing a mono-level virtual cluster system including a virtual dispatcher node and a virtual server node in a single server node which does not include a shared storage unit among a plurality of special network storing and merging blocks; and constructing a two-level double cluster system through collecting a number of the mono-level virtual cluster systems into several bundles.

2. Description of the Related Art

A continuous increase in Internet users has led Internet servers such as web servers to be configured in cluster type including multiple nodes, which can provide extensibility and high availability, instead of a single node. FIG. 1 is a configuration diagram illustrating a conventional cluster system including independent multiple nodes.

As illustrated in FIG. 1, the multiple nodes 110 and 120 of the conventional cluster system 100 (e.g., the Internet server cluster system) are mutually connected through a physical network. The physical and mutual connection of the multiple nodes 110 and 120 are attained as each of the multiple nodes 110 and 120 are connected with the same network through a corresponding communications line 1-A or 1-B. Also, each of the multiple nodes 110 and 120 are systems that can operate independently.

FIG. 2 is a configuration diagram illustrating a typical independent node system of the conventional cluster system illustrated in FIG. 1. As illustrated, the typical single independent node system 200 includes a central processing block 210, a main memory block 220, an auxiliary system source 230, and a typical network block 240, which is connected with a network through a corresponding communications line 2-A. The auxiliary system source 230 includes system units generally necessary for a conventional system except for the central processing block 210, the main memory block 220 and the typical network block 240.

As like the aforementioned Internet servers, multimedia streaming servers have been configured in cluster type to effectively deal with a continuous increase in Internet users and to provide a stable service.

In more detail of the multiple nodes 110 and 120 of the conventional cluster system 100 (e.g., the Internet server cluster system), the node 110 is a dispatcher node allocated at the front side of the cluster and the node 120 is a server node which actually provides a service. The dispatcher is often called "master" or "director" and there exist a number of the server nodes 120. The dispatcher node 110 manages the multiple server nodes 120 of the conventional cluster system 100 and regulates loads between the multiple server nodes 120 by assigning work inputted through the network to each of the server nodes 120.

Each of the server nodes 120 performs the assigned work independently under the conventional cluster system 100. That is, the individual server nodes 120 are objects of the independent work under the conventional cluster system 100.

Various methods for effectively configuring the conventional cluster system 100 including the independent multiple nodes 110 and 120 have been suggested. However, the suggested clustering methods are aimed to effectively configure and manage the cluster system including a single hierarchical system with independent multiple nodes which are connected through a physical network. Thus, it is difficult to apply the suggested clustering methods directly to a two-level double cluster system called "cluster of cluster," wherein a single server node becomes a mono-level virtual cluster system and a plurality of the mono-level virtual cluster systems are collected to become the two-level double cluster system.

SUMMARY OF THE INVENTION

Accordingly, the present invention is directed to a method for a hierarchical system configuration and an integrated scheduling to provide a multimedia streaming service on a two-level double cluster system, which substantially obviates one or more problems due to limitations and disadvantages of the related art.

It is an object of the present invention to provide a method for a hierarchical system configuration and an integrated scheduling to provide multimedia streaming service on a two-level double cluster system for allowing a large-scale of multimedia streaming transmission with high-efficiency and high-performance by configuring a two-level double cluster based multimedia server system through sequential operations of: implementing a mono-level virtual clustering method to an independent single server node system including a plurality of specific network storing and merging blocks for a rapid data transmission through a network, but not including a shared storing unit between the plurality of specific network storing and merging blocks; and collecting a plurality of the mono-level virtual server cluster based server nodes into several bundles, thereby providing the two-level double cluster based multimedia server system.

It is another object of the present invention to provide a method for a hierarchical system configuration and an integrated scheduling to provide a multimedia streaming service on a two-level double cluster system for allowing an effective integrated management of a system as a manager is able to configure a system variously according to a scale and a characteristic of the multimedia streaming service through: hierarchically configuring a multimedia streaming server system according to a scale and a characteristic of the multimedia streaming service, wherein the hierarchical multimedia streaming server system is configured into a two-level double cluster based system, which is a maximum-scale, a mono-level single virtual cluster based system, which is a medium-scale or a single virtual server node based system, which is a minimum-scale; and providing an integrated scheduling method which can be commonly useable for the multimedia streaming service under each of the aforementioned hierarchical multimedia streaming server systems.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for configuring a hierarchical multimedia streaming server system to provide a multimedia streaming service on a two-level double cluster system, the method including the steps of: determining whether only one server node exists; if only one server node exists, determining whether only one virtual server node/specific network storing and merging block exists; and if only one virtual server node/specific network storing and merging block exists, setting a system configuration mode for configuring a single virtual server node based multimedia streaming server system and determining a representative network address of a current system, wherein depending on a scale and a characteristic of the multimedia streaming service, the hierarchical multimedia streaming server system is configured into a single virtual server node based system, which is a minimum-scale, a mono-level single virtual cluster based system, which is a medium-scale, and a two-level double cluster based system, which is a maximum-scale.

In another aspect of the present invention, there is provided a method for providing an integrated scheduling of a hierarchical multimedia streaming server system to provide a multimedia streaming service on a two-level double cluster system, the method including the steps of: determining whether a system configuration mode of a current system is a two-level double cluster based system configuration mode; if the system configuration mode of the current system is not the two-level double cluster based system configuration mode, determining whether the system configuration mode of the current system is a mono-level single virtual cluster based system configuration mode; and if the system configuration mode of the current system is not the mono-level single virtual cluster based system configuration mode, performing a scheduling function for a single virtual server node based multimedia streaming server system according to the system configuration mode of the current system and a representative network address of the current system, wherein depending on a scale and a characteristic of the multimedia streaming service, the hierarchical multimedia streaming server system is configured into a single virtual server node based system, which is a minimum-scale, a mono-level single virtual cluster based system, which is a medium-scale, and a two-level double cluster based system, which is a maximum-scale and the integrated scheduling can be commonly used under each of the system configurations to provide the multimedia streaming service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Figure 1:
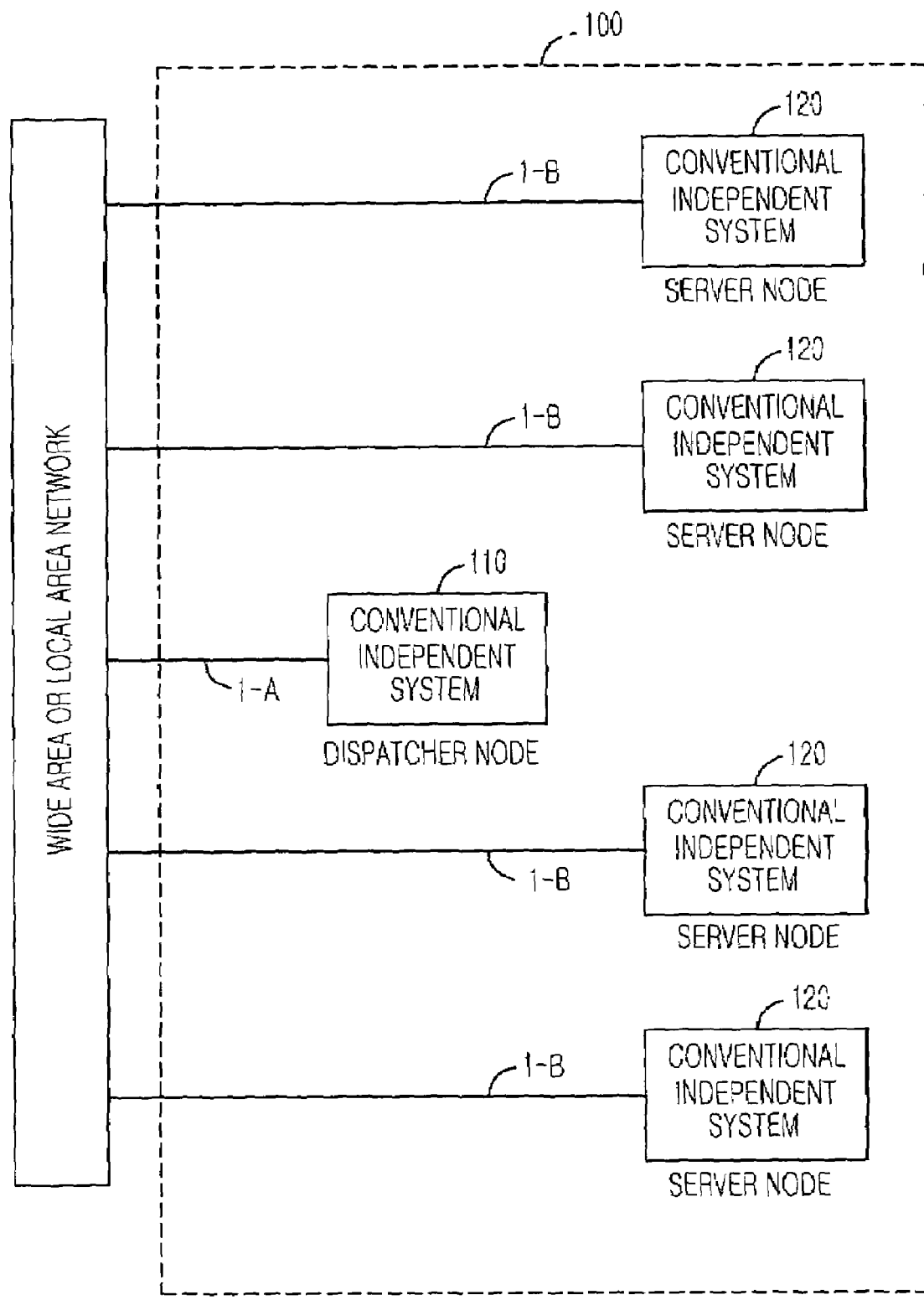
FIG. 1 is a configuration diagram illustrating a conventional cluster system.

Reference will now be made in detail to the preferred embodiments of the present invention, examples of which are illustrated in the accompanying drawings. It should be noted that like reference numerals denotes like elements described throughout different drawings.

Figure 2:
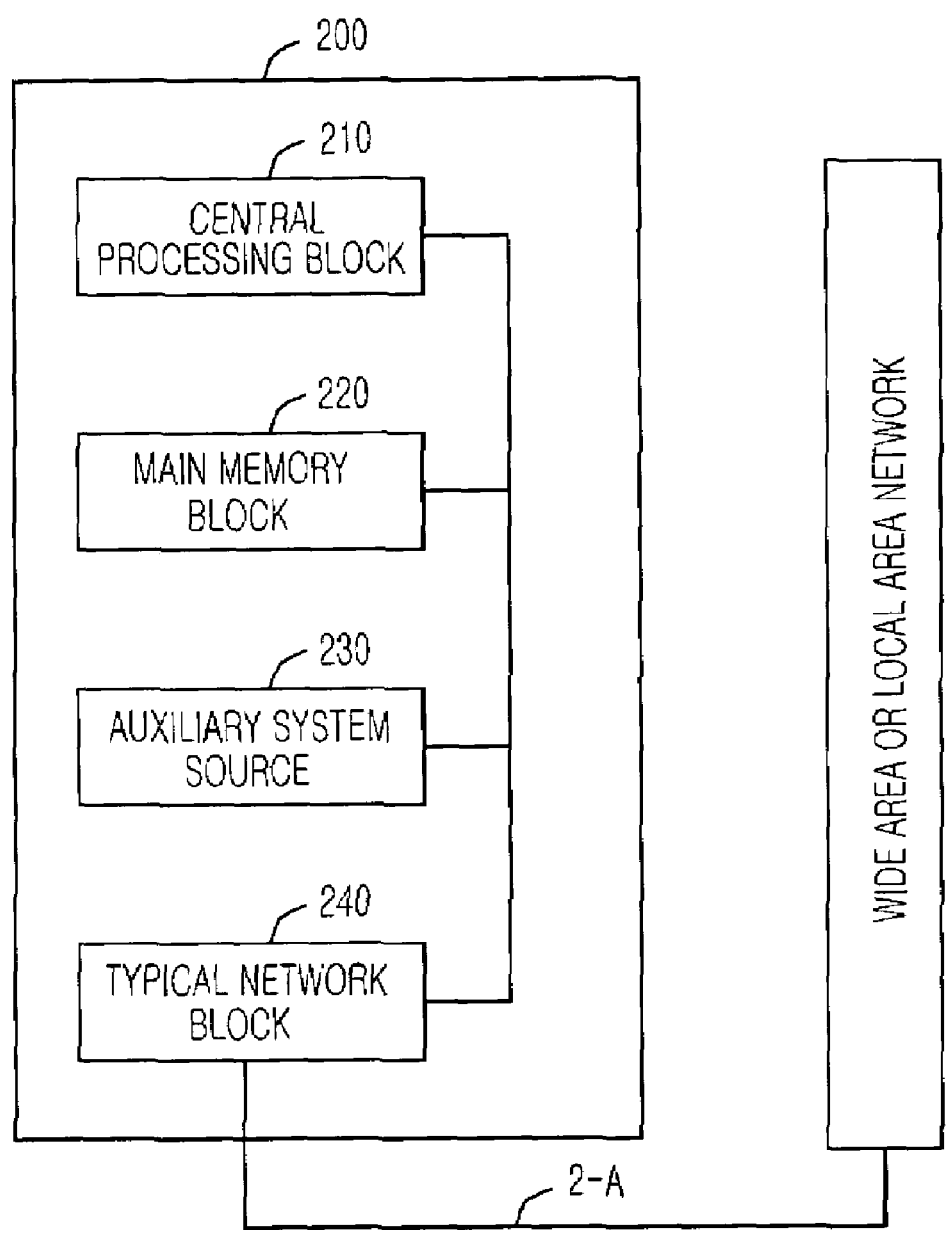
FIG. 2 is a configuration diagram illustrating a typical single server node system configuring the conventional cluster system.
Figure 3:
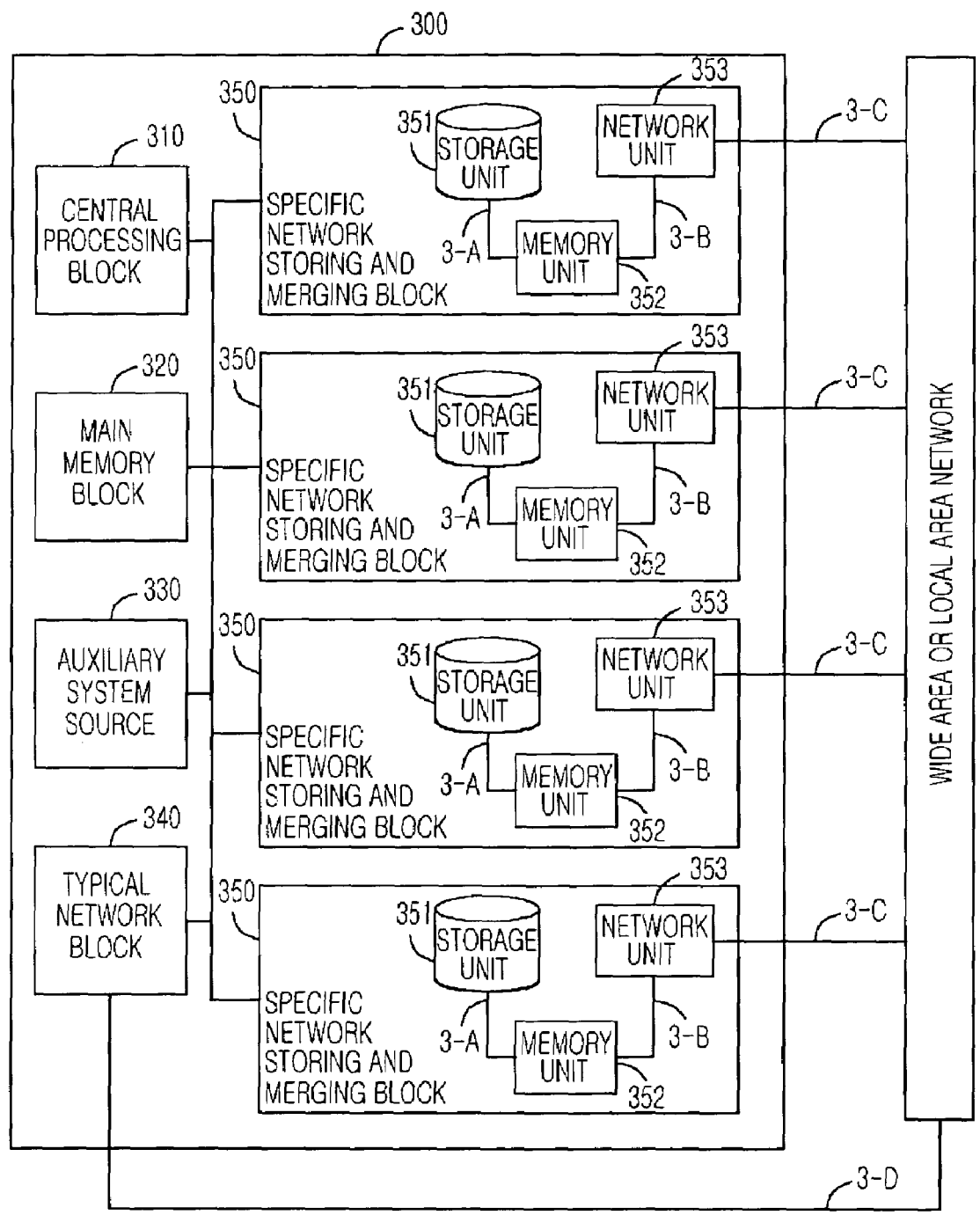
FIG. 3 is a configuration diagram illustrating a single server node system in accordance with a first embodiment of the present invention.

FIG. 3 is a configuration diagram illustrating a single server node system in accordance with a first embodiment of the present invention. As illustrated, the single server node system 300 includes the same elements of the conventional single node system 200, which is an independent system as illustrated in FIG. 2. That is, the single server node system 300 includes: a central processing block 310; a main memory block 320; an auxiliary system source 330; and a typical network block 340.

However, the single server node system 300 is different from the conventional single node system 200 in that the single server node system 300 includes a plurality of specific network storing and merging blocks 350 for a rapid data transmission through a network. The number of the specific network storing and merging blocks 350, which can be installed, varies depending on a characteristic of hardware of a system. Thus, although it is not necessary to limit the number of the specific network storing and merging blocks 350, only four of the specific network storing and merging blocks 350 are illustrated in FIG. 3 for the sake of convenience.

The plurality of specific network storing and merging blocks 350 transmit data stored into storage units rapidly through a network. Each of the specific network storing and merging blocks 350 includes: a storage unit 351; a memory unit 352; and a network unit 353. The individual network units 353 have a separate network address, for instance, an Internet protocol (IP) address. Data stored at the individual storage units 351 can be transmitted not to the main memory block 320 but to the corresponding memory units 352 through respective connection paths 3-A.

The data stored into the individual memory units 352 are transmitted to the corresponding network units 353 through respective connection paths 3-B. Using the separate network addresses, the data are transmitted through respective communications lines 3-C to a wide area or local area network. It should be noted that there is no shared storage unit between the specific network storing and merging blocks 350. That is, each of the specific network storing and merging blocks 350 includes the separate storage unit 351, which is not shared with other storage units 351 of the rest specific network storing and merging blocks 350.

Therefore, it is necessary to transmit data at only one specific network storing and merging block 350 for a rapid data transmission. That is, each of the network units 353 needs to transmit the data by interworking with the physically connected corresponding storage unit 351 of the corresponding specific network storing and merging block 350. Hence, each of the specific network storing and merging blocks 350 can operate independently without any mutual operation with the other specific network storing and merging blocks 350. For this reason, the performance of the single server node system 300 largely depends on an effective management of the specific network storing and merging blocks 350.

According to one exemplary embodiment of the present invention, a method for configuring a two-level double cluster system is suggested, wherein the two-level double cluster system is achieved through: configuring a mono-level virtual cluster system including a virtual dispatcher node and multiple virtual server nodes, which are applicable to an independent single server node system including multiple specific network storing and merging blocks without a shared storage unit between the specific network storing and merging blocks; and collecting the multiple mono-level virtual clusters into several bundles.

Also, according to another exemplary embodiment of the present invention, an integrated scheduling method is proposed, wherein the integrated scheduling method can be commonly applied to provide a multimedia streaming service under a hierarchical multimedia streaming service system such as a single virtual server node based system, which is a minimum-scale system with a single server node including only one virtual server node, a mono-level single virtual cluster based system, which is a medium-scale system, or a two-level double cluster based system, which is a maximum-scale system, each configured based on a scale or a characteristic of the multimedia streaming service.

Figure 4:
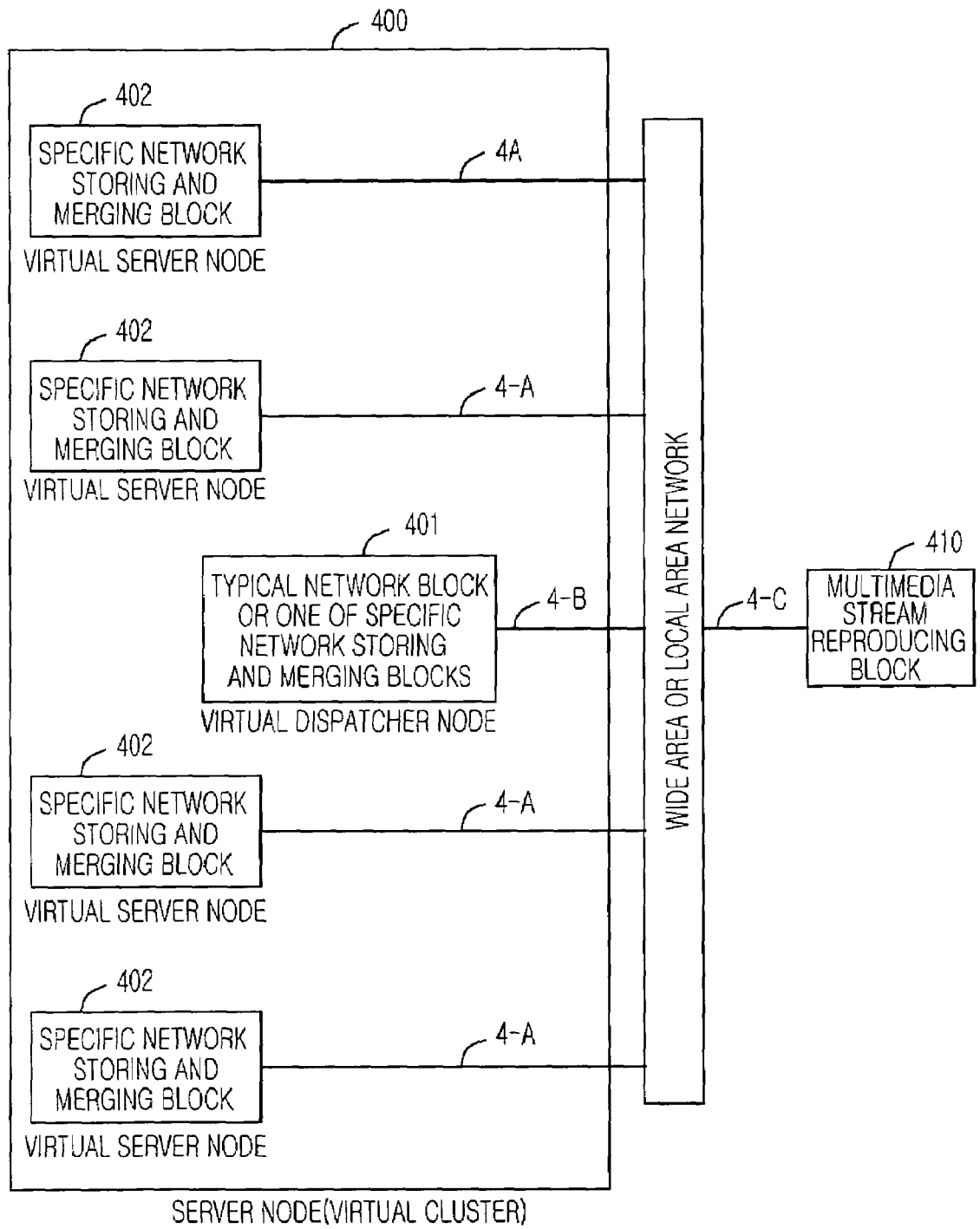
FIG. 4 is a configuration diagram illustrating a mono-level virtual cluster based multimedia streaming server node system implemented into the single server node system in accordance with a second embodiment of the present invention.

FIG. 4 is a configuration diagram illustrating a multimedia streaming server node system based on a mono-level virtual cluster implemented into the single server node system of FIG. 3 in accordance with a second embodiment of the present invention.

As mentioned above, the rapid data transmission in the single server node system 300 can be achieved when the data transmission takes place at only one specific network storing and merging block 350. This condition means that the individual specific network storing and merging blocks 350 should process assigned operations independently. For this reason, the multimedia streaming server node system based on the mono-level virtual cluster can be implemented in the independent single server node system 300. Each of the specific network storing and merging blocks 350 is defined as virtual server nodes 402 sharing the central processing block 310, the main memory block 320 and the auxiliary system source 330 of the single server node system 300. The single server node system 300 is defined as the mono-level virtual cluster based system 400 including the virtual server nodes 402.

On the basis of the above configuration, the single server node system 300 is a single independent system physically; however, it is possible to implement the mono-level virtual cluster based multimedia streaming server node system 400 operating like a cluster system logically Thus, an improved quality of the multimedia streaming service can be provided with maximally utilizing advantages of the cluster system.

As illustrated in FIG. 4, the mono-level virtual cluster based multimedia streaming server system 400 includes a virtual dispatcher node 401 and a plurality of virtual server nodes 402. The virtual dispatcher node 401 can be the typical network block 340 or one of the multiple specific network storing and merging blocks 350. In the case that the virtual dispatcher node 401 is one selected specific network storing and merging block 350, although the virtual dispatcher node 401 is distinguished from the virtual server nodes 402 logically, the selected specific network storing and merging block 350 can be the virtual dispatcher node 401 as simultaneously as one of the virtual server nodes 402 physically.

The individual virtual server nodes 402 have different separate network addresses and are connected with a wide area or local area network through corresponding communications lines 4-A. The mono-level virtual cluster based multimedia streaming server node system 400 is interworking with a multimedia stream reproducing block 410 connected with the wide area or local area network through a communication line 4-C.

Hereinafter, the connection through one certain virtual server node or the dispatcher node from outside means that the connection takes place from outside to the mono-level virtual cluster based multimedia streaming server system through the assigned network address allocated to the corresponding virtual server node or the dispatcher node.

If there is only one specific network storing and merging block 350, the independent single server node system 300 is treated as a multimedia streaming server system based on the single virtual server node 402.

Figure 5:
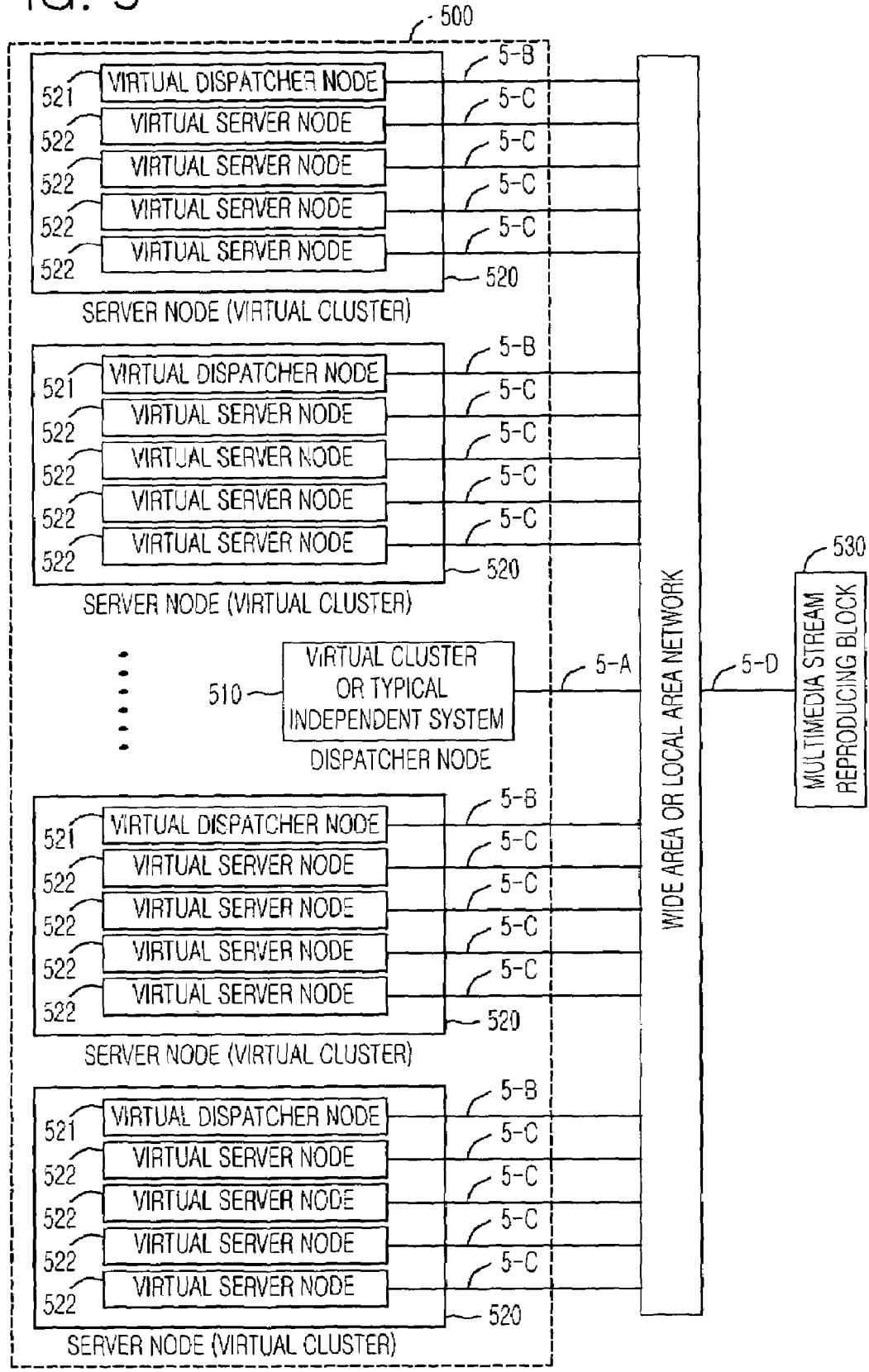
FIG. 5 is a configuration diagram illustrating a two-level double cluster based multimedia streaming server system comprising multiple server nodes based on the mono-level virtual cluster in accordance with a third embodiment of the present invention.

FIG. 5 is a configuration diagram illustrating a two-level double cluster based multimedia streaming server system obtained by collecting the mono-level virtual clusters illustrated in FIG. 4 into several bundles in accordance with a third embodiment of the present invention. The two-level double cluster based multimedia streaming server system 500 includes: one dispatcher node 510 and multiple mono-level virtual cluster based multimedia streaming server nodes 520.

Each of the multimedia streaming server nodes 520 includes a virtual dispatcher node 521 and multiple virtual server nodes 522. The individual virtual dispatcher nodes 521 and the individual virtual server nodes 522 have separate network addresses and are connected to a wide area or local area network through corresponding communications lines 5-B and 5-C.

The dispatcher node 510 can be the typical single node system 200 illustrated in FIG. 2 or the virtual cluster based single server node system 300. Also, physically, the dispatcher node 510 can be an additional system to the multimedia streaming server nodes 520 or one of the multimedia streaming server nodes 520 functions as the dispatcher node 510. That is, one node can be the dispatcher node 510 as simultaneously as one of the multimedia streaming server nodes 520. The dispatcher node 510 has a separate network address and is connected with the wide area or local area network through a corresponding communication line 5-A.

The two-level double cluster based multimedia streaming server system 500 is interworking with a multimedia stream reproducing block connected with the wide area or local area network through a communication line 5-D.

Figure 6:
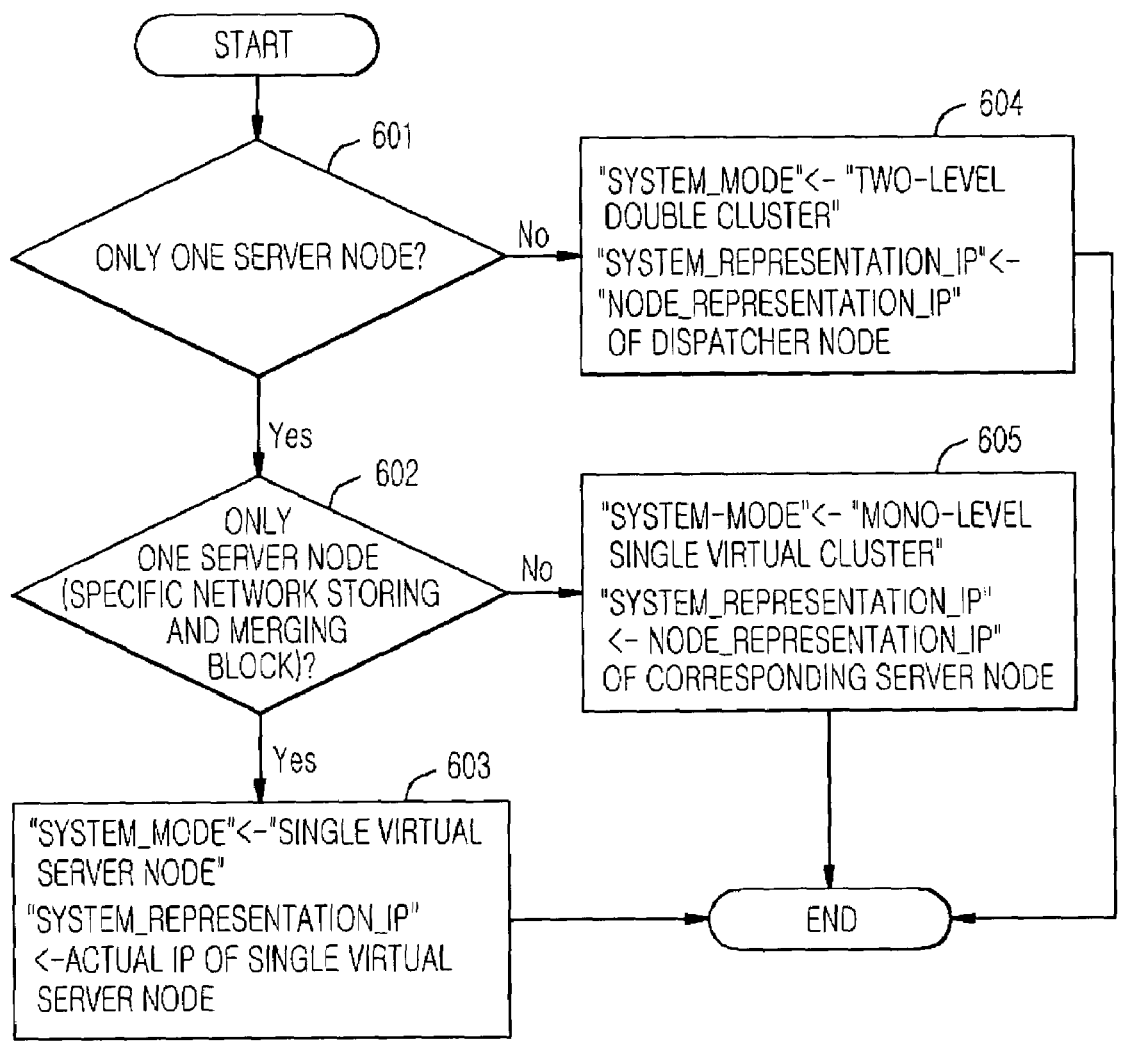
FIG. 6 is an operation flowchart for describing a method for configuring a system for an integrated scheduling which can be commonly used in a two-level double cluster based system, a mono-level single virtual cluster based system and a single virtual server node based system to provide a multimedia streaming service in accordance with one exemplary embodiment of the present invention.

FIG. 6 is an operation flowchart for describing a system configuration method for an integrated scheduling which can be commonly used in the two-level double cluster based system, the mono-level single cluster based system and the single virtual server node based system in order to provide a multimedia streaming service in accordance with the exemplary embodiment of the present invention. As described in FIGS. 4 and 5, the server system for the multimedia streaming service can be configured in the two-level double cluster, which is the maximum-scale, the mono-level single virtual cluster, which is the medium-scale, or the single virtual server node, which is the minimum-scale depending on a scale and a characteristic of the multimedia streaming service, which is intended to be provided.

It is necessary to determine a current status of the system configuration for the integrated scheduling for supporting the above exemplary system configurations. It is particularly necessary to define two wide area variables including a variable of "system_mode" and another variable of "system_representation_IP" to determine and maintain the system configuration.

The variable of "system_mode" has one value among "two-level double cluster", "mono-level single virtual cluster" and "single virtual server node" depending on a configuration status of the current system.

The variable of "system_representation_IP" is a network address representing the entire system, and is preset by a manager and opened to an external source. Addresses of virtual nodes or server nodes are not compelled to be opened to the external source. Thus, when a multimedia stream reproducing block is connected for the first time, the representative network address is used.

Hence, as illustrated in FIG. 6, the integrated scheduling which can be commonly used in the two-level double cluster based system, the mono-level single virtual cluster based system and the single virtual server node based system is possible when the variable of "system_mode" and the variable of "systemd_representation_IP" are assigned properly according to a status of a current system configuration.

In more detail of the integrated scheduling method, in operation 601, it is determined whether the entire system includes multiple server nodes. If the multiple server nodes exist in the entire system, in operation 604, the variable of "system_mode" is set as a value of "two-level double cluster," and the variable of "system_representation_IP" is mapped as a variable of "system_representation_IP" of a dispatcher node. If the variable "system_representation_IP" is a network address that represents the entire system, the variable of "node_representation IP" is a network address that represents each node. Actually, in the case of the typical independent single node system 200, the variable of "node_representation_IP" is mapped as an actual address of the typical network block 240. In the case of the virtual cluster based single server node system 300, the variable of "node_representation_IP" is mapped as an actual network address allocated to the virtual dispatcher node, which is one of the typical network block within the node and the virtual server nodes.

In operation 602, it is determined that the entire system includes only one server node and a plurality of virtual server nodes (i.e., the specific network storing and merging blocks), in operation 605, the variable of "system_mode" is set as a value of "mono-level single virtual cluster," and the variable of "system_representation_IP" is mapped as a variable of "node_representation_IP" of the corresponding server node.

In operation 603, if the entire system includes only one server node and one virtual server node (i.e., the specific network storing and merging block), the variable of "system_mode" is set as a value of "single virtual server node," and the variable of "system_representation_IP" is mapped as an actual network address of the single virtual server node.

Figure 7:
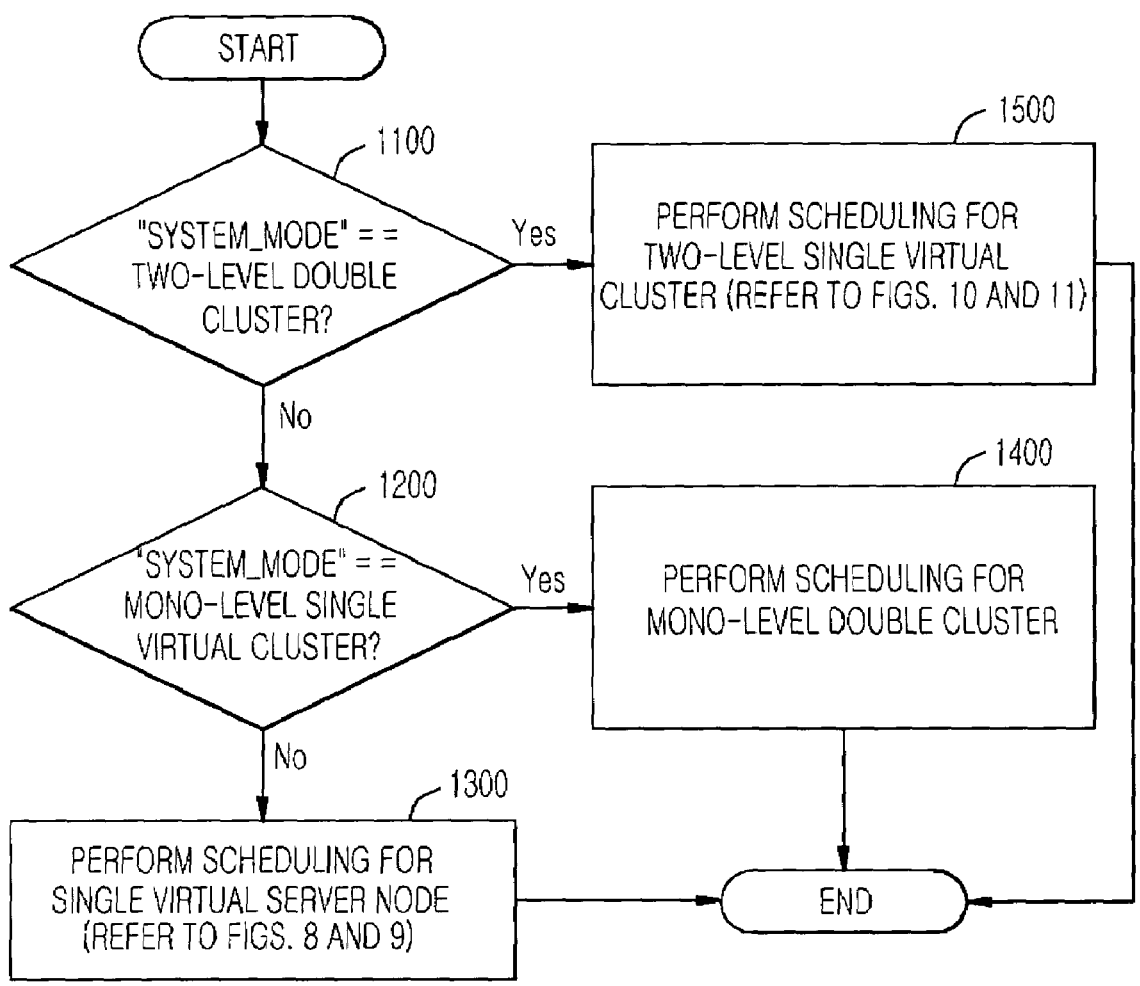
FIG. 7 is an operation flowchart for describing an integrated scheduling method which can be commonly used in a two-level double cluster based system, a mono-level single virtual cluster based system and a single virtual server node based system to provide a multimedia streaming service in accordance with another exemplary embodiment of the present invention.

FIG. 7 is an operation flowchart for describing an integrated scheduling method to provide a multimedia streaming service, wherein the integrated scheduling method can be commonly used in the two-level double cluster based system, a mono-level single virtual cluster based system and a single virtual server node based system in accordance with the other exemplary embodiment of the present invention.

As described in FIG. 6, the integrated scheduling method for the aforementioned system configurations is performed using the variables of "system_mode," "system_representation_IP," and "node_representation_IP" defined according to a status of the current system configuration. Detailed description of the integrated scheduling method is provided hereinafter.

In operation S1200, if the variable of "system_mode" is defined as the value of "single virtual server node," a scheduling function for use in the single virtual server node is performed in operation S1300. This scheduling function will be described in detail in FIGS. 8 and 9. Meanwhile, if the variable of "system_mode" is defined as the value of "mono-level single virtual cluster," a scheduling function for use in the mono-level single virtual cluster is performed in operation S1400. This scheduling function will be described in detail in FIGS. 10 and 11.

If the variable of "system_mode" is defined as the value of "two-level double cluster" in operation S1100, a scheduling function for use in the two-level double cluster will be performed in operation S1500. This scheduling function will be described in detail in FIGS. 12 to 14.

Figure 8:
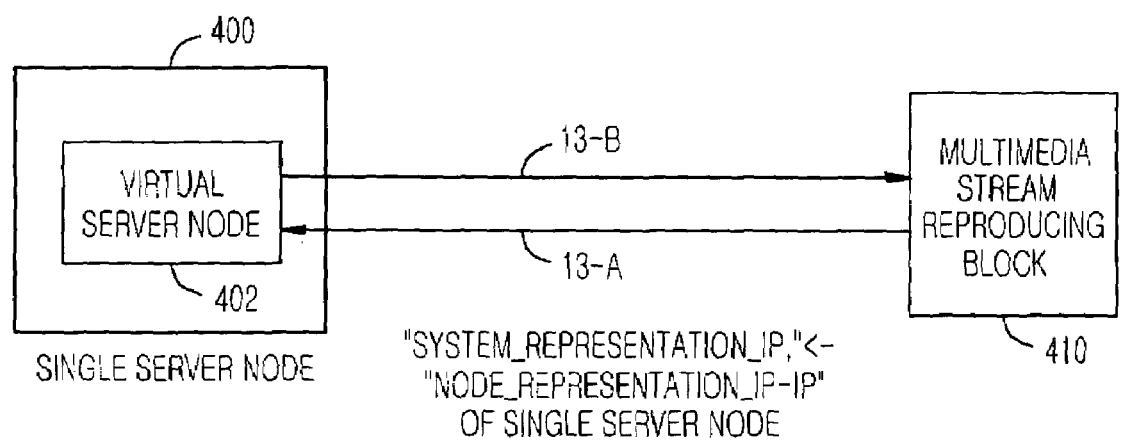
FIG. 8 is a diagram briefly illustrating a scheduling method for the single virtual server node based multimedia streaming server system of FIG. 7.

FIG. 8 is a diagram illustrating an interworking relationship between the mono-level virtual cluster multimedia streaming server system and the multimedia stream reproducing block for providing a multimedia streaming service in accordance with the other exemplary embodiment of the present invention.

As described in FIG. 6, since the value of "system_representation_IP" is precedently mapped as an actual IP of the single virtual server node 402, the multimedia stream reproducing block 410 requests a streaming service directly to the single virtual server node 402 of the mono-level virtual cluster based multimedia streaming server system 400. A reference denotation 13-A expresses this request activity.

Once the mono-level virtual cluster based multimedia streaming server system 400 receives the request through the single virtual server node 402, the mono-level virtual cluster based multimedia streaming server system 400 can provide an actual multimedia streaming service through the virtual server node 402. A reference denotation 13-B expresses this service providing activity.

Figure 9:
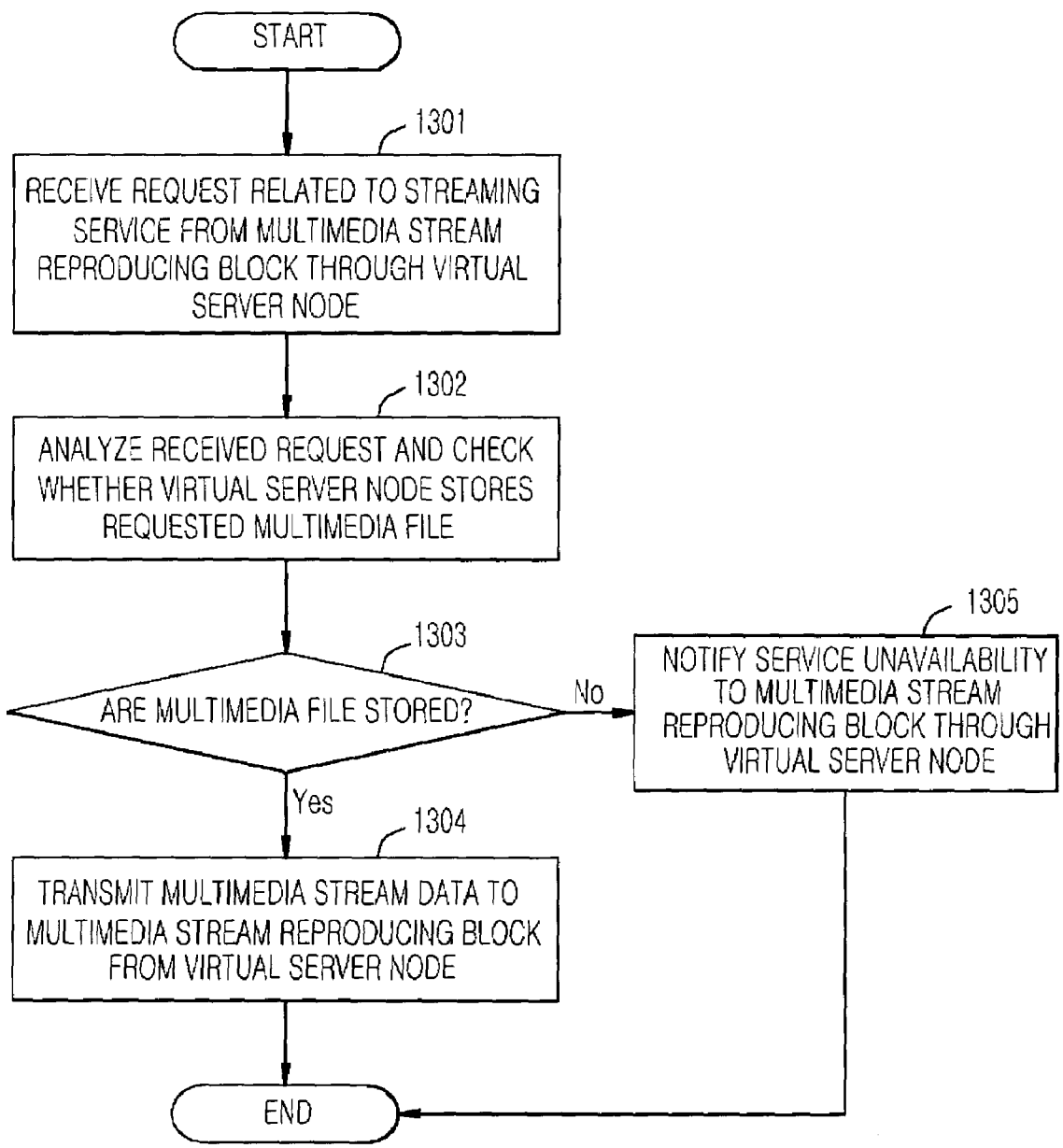
FIG. 9 is an operation flowchart for describing the scheduling method for the single virtual server node based multimedia streaming server system of FIG. 8.

FIG. 9 is an operation flowchart for describing a method for providing a single virtual server node based multimedia streaming service in accordance with the other exemplary embodiment of the present invention. Especially, FIG. 9 illustrates sequential operations at the mono-level virtual cluster based multimedia streaming serve system on the basis of the interworking relationship described in FIG. 8.

In operation S1301, the mono-level virtual cluster based multimedia streaming server system 400 receives a request related to a streaming service from the multimedia stream reproducing block 410 through the single virtual server node 402. As described in FIG. 6, since the value of "system_representation_IP" is precedently mapped as an actual IP of the single virtual server node 402, in operation S1301, the multimedia stream reproducing block 410 requests the streaming service directly to the single virtual server node 402 of the mono-level virtual cluster based multimedia streaming server system 400.

In operation S1302, the mono-level virtual cluster based multimedia streaming server system 400 analyzes the received request and checks whether the single virtual server node 402 stores the requested multimedia file (i.e., checks whether it is possible to provide the streaming service.

If it is determined that the single virtual server node 402 stores the requested multimedia file in operation S1303, in operation S1304, the multimedia stream data is transmitted to the multimedia stream reproducing block 410 from the single virtual server node 402.

If it is determined that the single virtual server node 402 does not store the requested multimedia file in operation S1303, the multimedia stream reproducing block 410 is notified of unavailability in providing the requested streaming service through the single virtual server node 402 in operation S1305 and terminates the scheduling operation.

Figure 10:
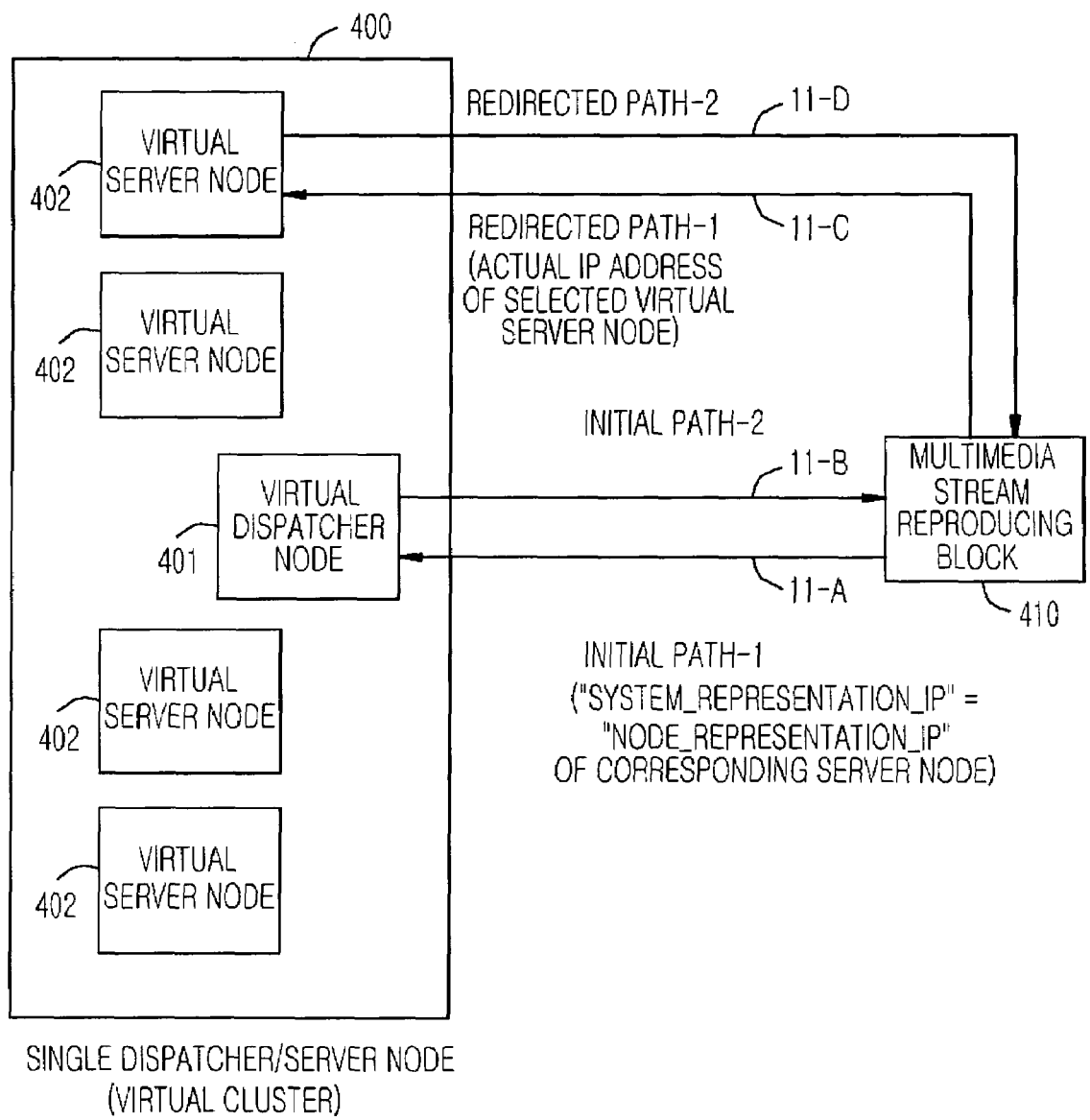
FIG. 10 is a diagram briefly illustrating a scheduling method for the mono-level virtual cluster based multimedia streaming server system of FIG. 7.

FIG. 10 is a diagram illustrating an interworking relationship between the mono-level virtual cluster based multimedia streaming server system described in FIG. 4 and the multimedia stream reproducing block for providing a multimedia streaming service in accordance with the other exemplary embodiment of the present invention. Particularly, FIG. 10 illustrates the interworking relationship based on a redirection method. In this redirection method, only the single node simultaneously serves roles as the dispatcher node and the server node.

The mono-level virtual cluster based multimedia streaming server system 400 can provide the multimedia streaming service to the multimedia stream reproducing block 410 through two path types. The first path type called "initial path" includes an initial path-1 11A and an initial path-2 11-B.

As described in FIG. 6, since the value of "system_representation_IP" is precedently mapped as the value of "node_representation_IP" of the mono-level virtual cluster based multimedia streaming server system 400 (i.e., the IP of the virtual dispatcher node 401), the multimedia stream reproducing block 410 requests a streaming service through the virtual dispatcher node 401 of the mono-level virtual cluster based multimedia streaming server system 400 using the initial path-1 11-A.

Once the mono-level virtual cluster based multimedia streaming server system 400 receives the request through the virtual dispatcher node 401, the mono-level virtual cluster based multimedia streaming server system 400 selects an optimum virtual server node among the virtual server nodes 402 and informs an address of the selected optimum virtual server node 402 to the multimedia stream reproducing block 410 using the initial path-2 11-B. In FIG. 10, the virtual server node 402 at the upper most side is assumed to be the optimum virtual server node for the sake of convenience.

If the multimedia stream reproducing block 410 receives the address of the selected virtual server node 402, the multimedia stream reproducing block 410 can generate the virtual server node 402 and the second path type called "redirected path."

The multimedia stream reproducing block 410 requests a streaming service again through the selected virtual server node 402 using a redirected path-1 11-C. Once the mono-level virtual cluster based multimedia streaming server system 400 receives the request through the selected virtual server node 402, the mono-level virtual cluster based multimedia streaming server system 400 can provide the multimedia streaming service through the selected virtual server node 402 using a redirected path-2 11-D.

One important fact in the interworking relationship between the mono-level virtual cluster based multimedia streaming server system 400 and the multimedia stream reproducing block 410 based on the redirection method is that the two path types (i.e., the initial path and the redirected path) are sequentially activated.

Figure 11:
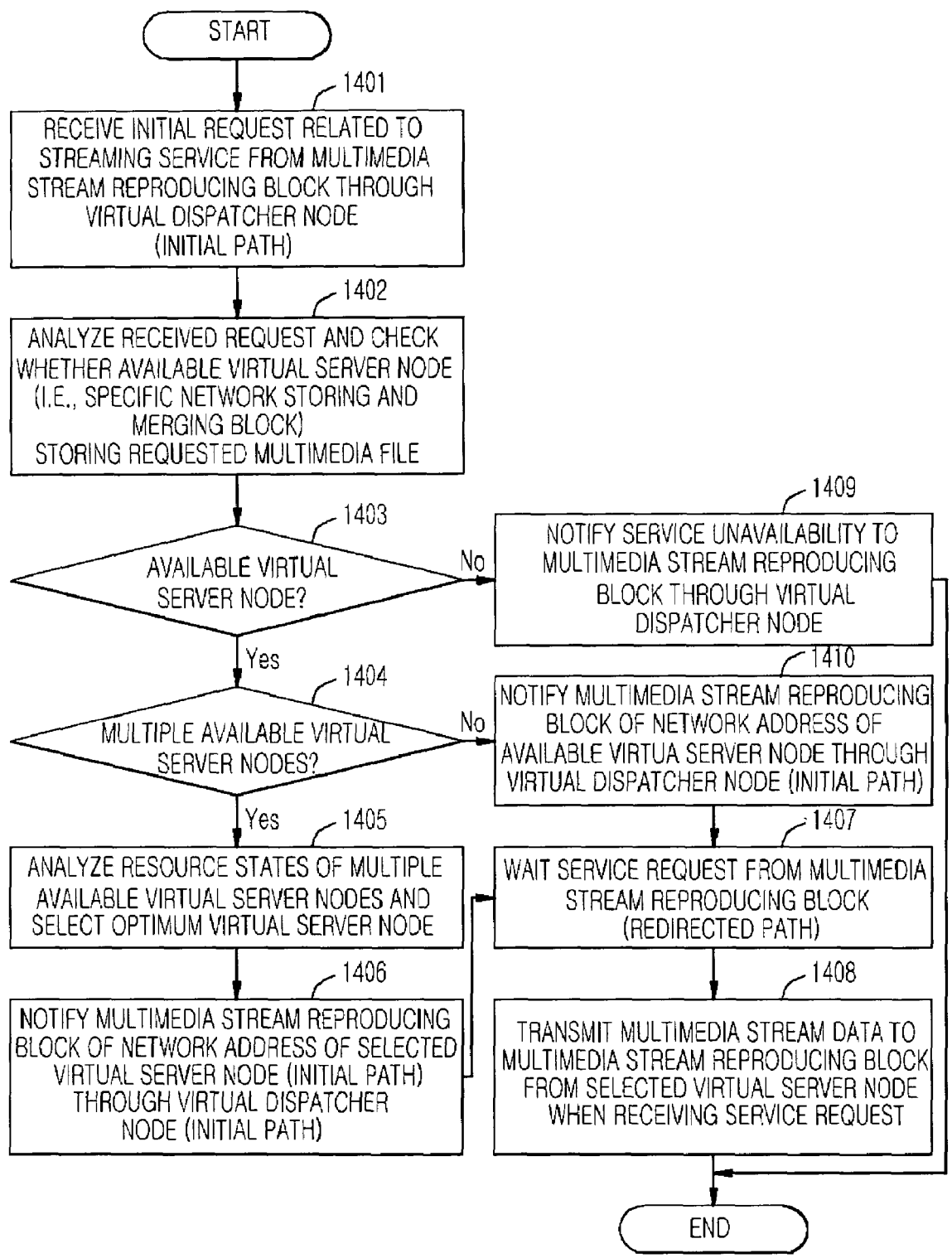
FIG. 11 is an operation flowchart for describing the scheduling method for the mono-level virtual cluster based multimedia streaming server system of FIG. 10.

FIG. 11 is an operation flowchart for describing a method for providing a mono-level virtual cluster based multimedia streaming service in accordance with the other exemplary embodiment of the present invention. Especially, FIG. 11 illustrates sequential operations at the mono-level virtual cluster based multimedia streaming server system on the basis of the interworking relationship described in FIG. 10.

In operation S1401, the mono-level virtual cluster based multimedia streaming server system 400 receives an initial request related to a streaming service from the multimedia stream reproducing block 410 through the virtual dispatcher node 401. As described in FIG. 6, since the value of "system_representation_IP" is precedently mapped as the value of "node_representation_IP" of the mono-level virtual cluster based multimedia streaming server system 400 (i.e., the IP of the virtual dispatcher node), in operation S4101, the multimedia stream reproducing block 410 requests the streaming service through the virtual dispatcher node 401.

In operation S1402, the mono-level virtual cluster based multimedia streaming server system 400 analyzes the received request and checks whether there is an available virtual server node (i.e., the available specific network storing and merging block) which stores the requested media file, that is, which can provide the streaming service.

In operation S1403, if there is no available virtual server node, in operation S1404, the multimedia stream reproducing block 410 is notified of unavailability in providing the requested streaming service through the virtual dispatcher node 401, and the scheduling operation is terminated thereafter. If an available virtual server node exists, it is checked whether there is/are one available virtual server node or multiple virtual server nodes in operation S1404.

If there is one available virtual server node exists in operation S1404, in operation S1410, the multimedia stream reproducing block 410 is notified of a network address of the available virtual server node 402 through the virtual dispatcher node 401.

In operation S1407, the mono-level virtual cluster based multimedia streaming server system 400 awaits the service request from the multimedia stream reproducing block 410. When the service request is received during the standby state, in operation S1408, the multimedia stream data is transmitted from the selected virtual server node 402 to the multimedia stream reproducing block 410.

If there are multiple available virtual server nodes exist in operation S1404, the mono-level virtual cluster based multimedia streaming server system 400 analyzes resource states of multiple available virtual servers and selects an optimum virtual server node in operation S1405.

In operation S1406, if the mono-level virtual cluster based multimedia streaming server system 400 informs a network address of the selected virtual server node 402 to the multimedia stream reproducing block 410 through the virtual dispatcher node 401.

In operation S1407, the mono-level virtual cluster based multimedia streaming server system 400 awaits the service request from the multimedia stream reproducing block 410. When the service request is received during the standby state, in operation S1408, the multimedia stream data is transmitted from the selected virtual server node 402 to the multimedia stream reproducing block 410.

Figure 12:
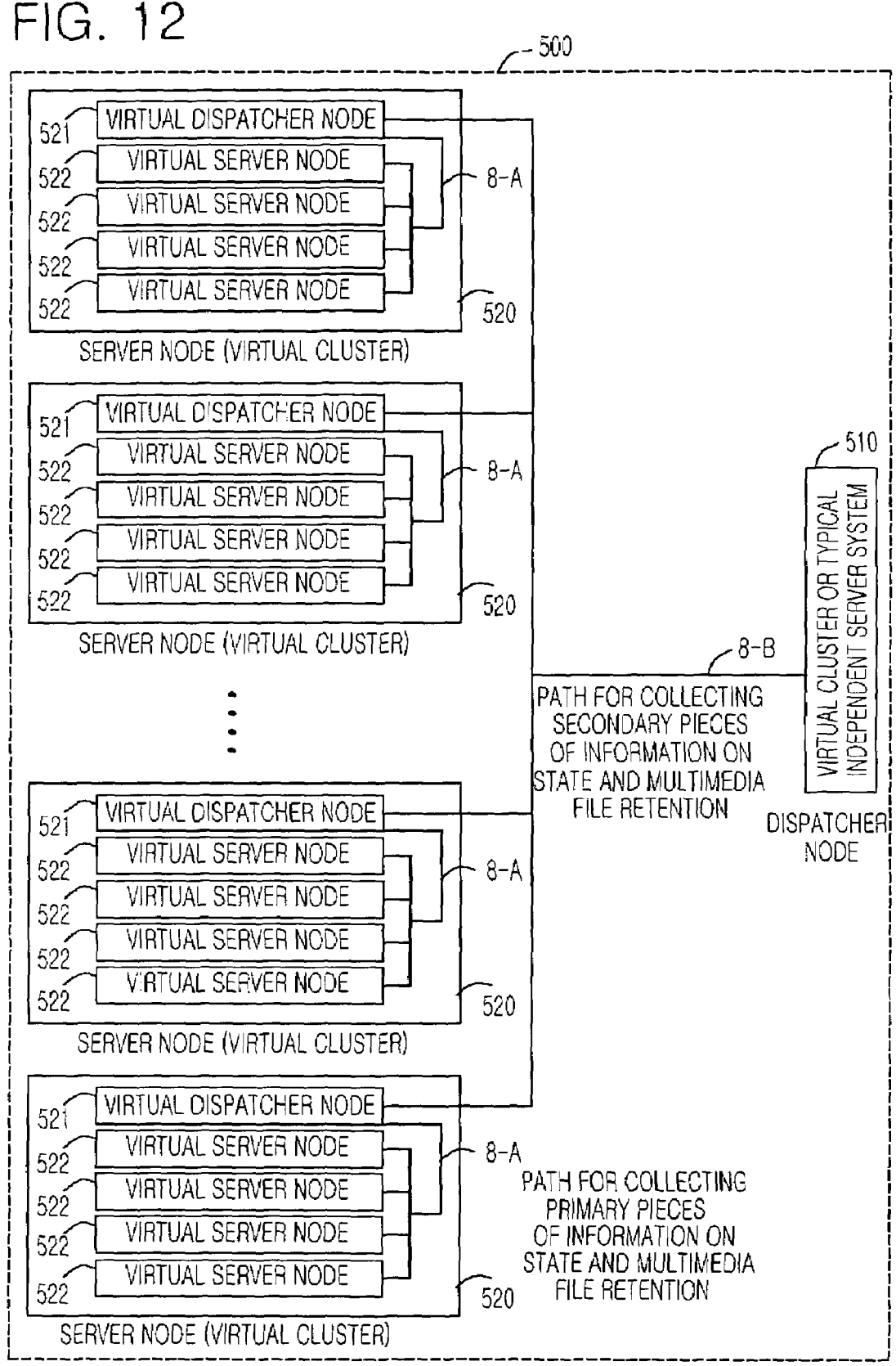
FIG. 12 is a diagram briefly illustrating a state information monitoring method and a multimedia file information collecting method for a scheduling function for the two-level double cluster based multimedia streaming server system of FIG. 7.

FIG. 12 is a diagram for describing a method for monitoring and collecting information on a state of each server node such as a work load state and an operation state and a method for collecting information on multimedia files, both necessary for scheduling a two-level double cluster based multimedia streaming service, in accordance with the other exemplary embodiment of the present invention.

The individual mono-level virtual cluster based multimedia streaming server nodes 520 perform a first collection operation 8-A by checking the states of the virtual server nodes 522 and then performs a second collection operation 8-B by periodically reporting the check results to the dispatcher node 510 of the two-level double cluster based multimedia streaming server system 500 through the corresponding virtual dispatcher nodes 521.

The dispatcher node 510 of the two-level double cluster based multimedia streaming server system 500 periodically collects information on the states of the virtual server nodes 522 of each of the mono-level virtual cluster based multimedia streaming server nodes 520 through the corresponding virtual dispatcher nodes 521 and uses the collected information for the scheduling.

In addition to the above collected information, the dispatcher node of the two-level double cluster based multimedia streaming server system 500 should collect information on multimedia files that the mono-level virtual cluster based multimedia streaming server nodes 520 retain. Therefore, each of the mono-level virtual cluster based multimedia streaming server nodes 520 retains information on the multimedia files of the virtual server nodes 522, and this retaining operation is referred as the first collection operation 8-A. As information is changed (i.e., addition or deletion of the multimedia file), the individual mono-level cluster based multimedia streaming server nodes 520 is compelled to report this change to the dispatcher node 510 of the two-level double cluster based multimedia streaming server system 500 through the corresponding virtual dispatcher nodes 521, and this reporting operation is referred as the second collection operation 8-B.

On the basis of the above described collection operations, the information on the states of the virtual server nodes such as work load states and operation states and the information on the multimedia files, both pieces of information being necessary for the scheduling of the multimedia streaming service based on the two-level double cluster based multimedia streaming service, are collected in two stages.

Figure 13:
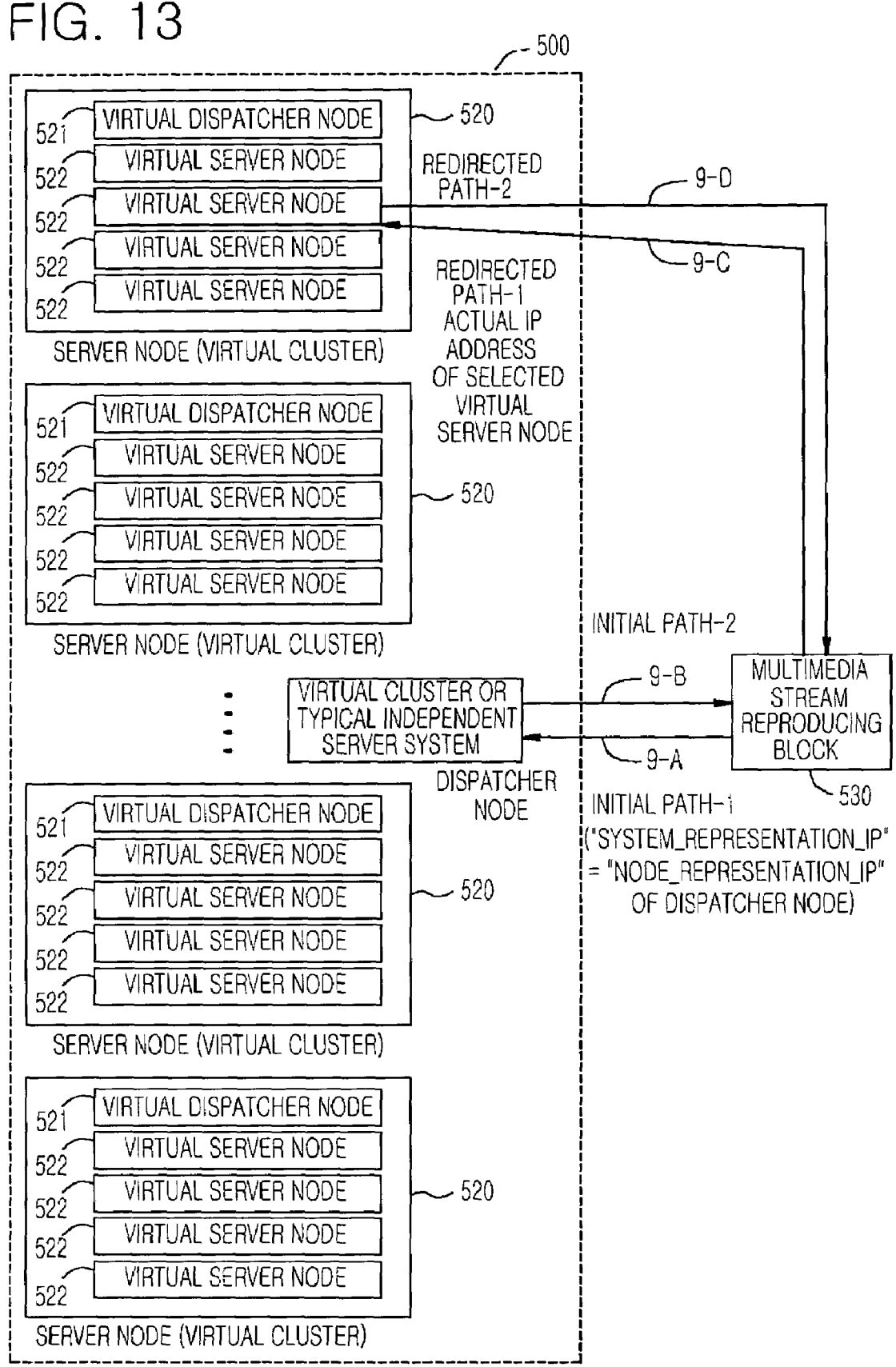
FIG. 13 is a diagram briefly illustrating a scheduling method for the two-level double cluster based multimedia streaming server system of FIG. 7.

FIG. 13 is a diagram illustrating an interworking relationship between the two-level double cluster based multimedia streaming server system of FIG. 5 and the multimedia stream reproducing block for providing the multimedia streaming service in accordance with the exemplary embodiment of the present invention. Especially, FIG. 13 illustrates the interworking relationship based on a redirection method.

The two-level double cluster based multimedia streaming server system 500 can provide the multimedia streaming service to the multimedia stream reproducing block 530 through two path types. The first path type called "initial path" includes an initial path-1 9-A and an initial path-2 9-B.

As described in FIG. 6, since the value of "system_representation_IP" is precedently mapped as the value of "node_representation_IP" of the dispatcher node 510 of the two-level double cluster based multimedia streaming server system 500, the multimedia stream reproducing block 530 requests a streaming service through the dispatcher node 510 of the two-level double cluster based multimedia streaming server system 500 using the initial path-1 9-A.

Once the two-level double cluster based multimedia streaming server system 500 receives the request through the dispatcher node 510, the two-level double cluster based multimedia streaming server system 500 selects an optimum virtual server node among the virtual server nodes 522 and informs an address of the selected optimum virtual server node to the multimedia stream reproducing block 530 using the initial path-2 9-B. In FIG. 13, the virtual server node 522 at the third place of the upper most side is assumed to be the optimum virtual server node for the sake of convenience.

The above scheduling method described in FIG. 13 is different from the scheduling method in the conventional cluster system in that the dispatcher node 510 does not select the optimum server node 520 but the optimum virtual server node 522. As described in FIG. 12, this selection is possible because the dispatcher node 510 collects and is periodically reported of the information on the states of the virtual server nodes 522 such as work load states and operation states and the information on the multimedia files through the corresponding virtual dispatcher nodes 521.

If the multimedia stream reproducing block 530 receives the address of the selected virtual server node 522, the multimedia stream reproducing block 530 can generate the virtual server node 522 and the second path type called "redirected path."

The multimedia stream reproducing block 530 requests a streaming service again through the selected virtual server node 522 using a redirected path-1 9-C. Once the two-level double cluster based multimedia streaming server system 500 receives the request through the selected virtual server node 522, the mono-level virtual cluster based multimedia streaming server node 520 can provide the multimedia streaming service through the selected virtual server node 522 using a redirected path-2 9-D.

One important fact in the interworking relationship between the two-level double cluster based multimedia streaming server system 500 and the multimedia stream reproducing block 530 based on the redirection method is that the two path types (i.e., the initial path and the redirected path) are sequentially activated.

Figure 14:
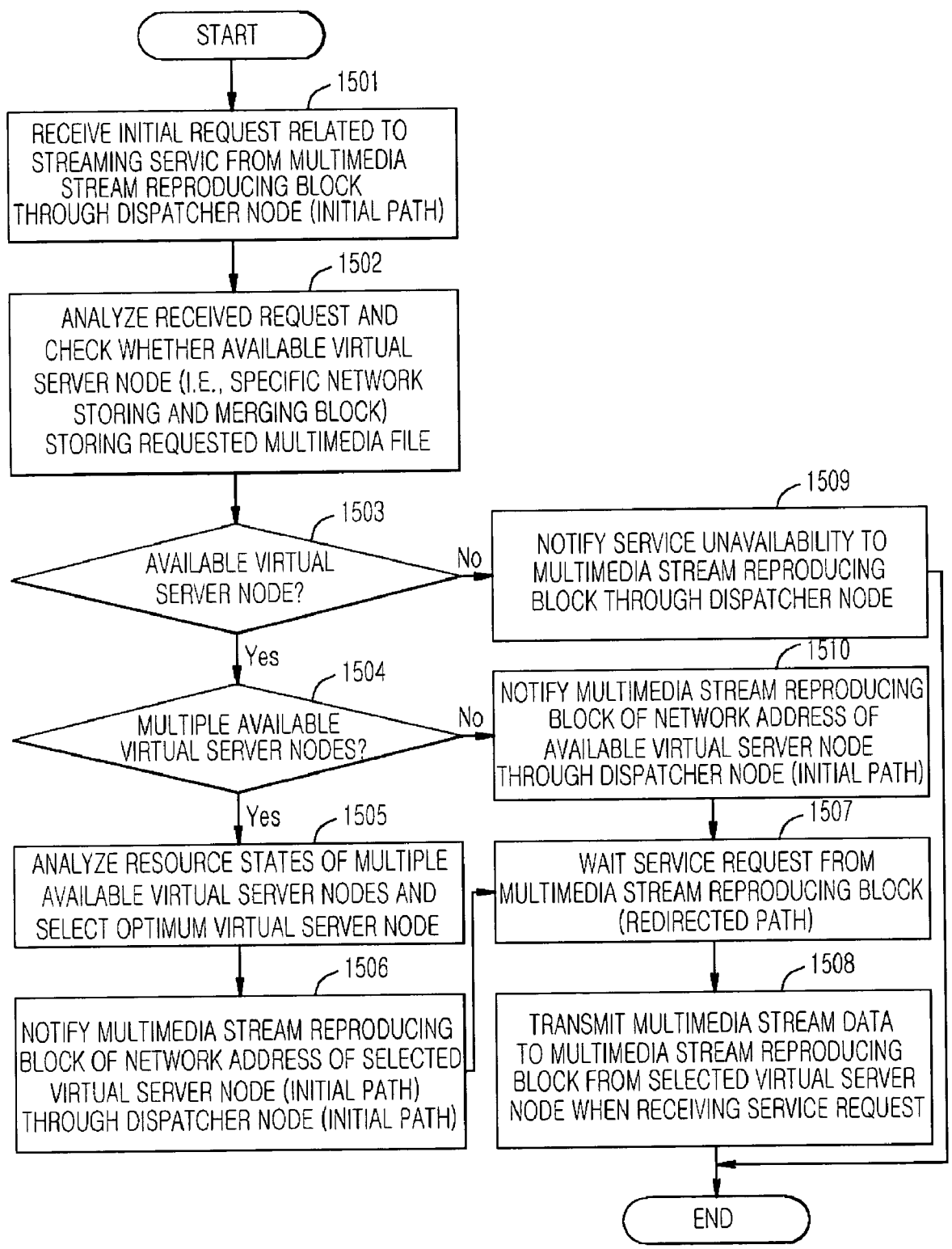
FIG. 14 is an operation flowchart for describing the scheduling method for the two-level double cluster based multimedia streaming server system of FIG. 13.

FIG. 14 is an operation flowchart for describing a method for providing a two-level double cluster based multimedia streaming service in accordance with the other exemplary embodiment of the present invention. Especially, FIG. 14 illustrates sequential operations at the two-level double cluster based multimedia streaming server system on the basis of the interworking relationship described in FIG. 13.

In operation S1501, the two-level double cluster based multimedia streaming server system 500 receives an initial request related to a streaming service from the multimedia stream reproducing block 530 through the dispatcher node 510. As described in FIG. 6, since the value of "system_representation_IP" is precedently mapped as the value of "node_representation_IP" of the dispatcher node 510 of the two-level double cluster based multimedia streaming server system 500, in operation S1501, the multimedia stream reproducing block 530 requests the streaming service through the dispatcher node 510.

In operation S1502, the two-level double cluster based multimedia streaming server system 500 analyzes the received request and checks whether there is an available virtual server node (i.e., the available specific network storing and merging block) which stores the requested media file, that is, which can provide the streaming service.

In operation S1503, if there is no available virtual server node, in operation S1509, the multimedia stream reproducing block 530 is notified of unavailability in providing the requested streaming service through the dispatcher node 510, and the scheduling operation is terminated thereafter. If an available virtual server node exists, it is checked whether there is/are one available virtual server node or multiple virtual server nodes in operation S1504.

If there is one available virtual server node exists in operation S1504, in operation S1510, the multimedia stream reproducing block 530 is notified of a network address of the available virtual server node 522 through the dispatcher node 401.

In operation S1507, the two-level double cluster based multimedia streaming server system 500 awaits the service request from the multimedia stream reproducing block 530. When the service request is received during the standby state, in operation S1508, the multimedia stream data is transmitted from the selected virtual server node 522 to the multimedia stream reproducing block 530.

If there are multiple available virtual server nodes exist in operation S1504, the two-level virtual cluster based multimedia streaming server system 500 analyzes resource states of multiple available virtual servers and selects an optimum virtual server node in operation S1505.

In operation S1506, if the two-level double cluster based multimedia streaming server system 500 informs a network address of the selected virtual server node 522 to the multimedia stream reproducing block 530 through the dispatcher node 510.

In operation S1507, the two-level double cluster based multimedia streaming server system 500 awaits the service request from the multimedia stream reproducing block 530. When the service request is received during the standby state, in operation S1508, the multimedia stream data is transmitted from the selected virtual server node 522 to the multimedia stream reproducing block 530.

The above described methods according to the exemplary embodiments of the present invention can be written as computer programs and can be implemented in a computer readable recording medium including a CD-ROM, a RAM, a ROM, a floppy disk, a hard disk, or an optical disk.

According to the exemplary embodiments of the present invention, the hierarchical system configuration method and the integrated scheduling method for providing multimedia streaming service on the two-level double cluster system can allow a large-scale of multimedia streaming transmission with high-effectiveness and high-performance through sequential operations of: implementing the mono-level virtual clustering method to the independent single node server system through the predetermined network, wherein the independent single node server system includes the multiple specific network storing and merging blocks for a rapid transmission but does not include a shared storage unit between the multiple specific network storing and merging blocks; and collecting a plurality of the mono-level virtual cluster based server nodes into several bundles, thereby obtaining the two-level double cluster based multimedia streaming server system.

Also, according to the exemplary embodiments of the present invention, managers are able to configure the system variously depending on a scale and a characteristic of the multimedia streaming service and to manage the system in an integrated manner by configuring the multimedia streaming server system hierarchically depending on the scale and the characteristic of the multimedia streaming service, wherein the multimedia streaming server system is configured in the two-level double cluster based system, which is the maximum-scale, in the mono-level single virtual cluster based system, which is the medium-scale, or in the single virtual server node based system, which is the minimum-scale and providing the integrated scheduling method which can be commonly used in each of these system configurations for providing the multimedia streaming service.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. One or more computer-readable media comprising computer-readable instructions thereon which, when executed by a computer, perform a method for configuring a hierarchical multimedia streaming server system to provide a multimedia streaming service on a two-level double cluster system, the method comprising the steps of:

determining whether only one server node exists;

if only one server node exists, determining whether only one virtual server node/specific network storing and merging block exists; and if only one virtual server node/specific network storing and merging block exists, setting a system configuration mode for configuring a single virtual server node based multimedia streaming server system and determining a representative network address of a current system, if there exists more than one virtual server node/specific network storing and merging block, the step of setting a system configuration mode for configuring a mono-level single virtual cluster based multimedia streaming server system including one virtual dispatcher node and multiple virtual server nodes and setting a representative network address of a current system, wherein depending on a scale and a characteristic of the multimedia streaming service, the hierarchical multimedia streaming server system is configured into a single virtual server node based system, which is a minimum-scale, a mono-level single virtual cluster based system, which is a medium-scale, and a two-level double cluster based system, which is a maximum-scale, and wherein if the system configuration mode of the current system is the mono-level single virtual cluster based system configuration mode, performing a scheduling function for a mono-level virtual cluster based multimedia streaming server including the steps of:

receiving an initial request related to a streaming service from a multimedia steam reproducing block through the virtual dispatcher node;

analyzing the request and checking whether there is an available virtual server node storing a corresponding multimedia file;

determining whether the available virtual server node exists;

if the available virtual server node exists, determining whether there are multiple available virtual server nodes;

if the multiple available virtual server nodes exist, analyzing resource states of multiple available virtual servers and selecting an optimum virtual server node;

notifying a network address of the selected virtual server node to the multimedia stream reproducing block through the virtual dispatcher node;

awaiting a request related to the streaming service from the multimedia stream reproducing block; and transmitting a multimedia stream data to the multimedia stream reproducing block from the selected virtual server node when receiving the request from the multimedia stream reproducing block.

2. The computer-readable media of claim 1, further including, if there exists more than one server node, the step of setting a system configuration mode for configuring a two-level double cluster based multimedia streaming server system including one dispatcher node and multiple server nodes/mono-level virtual clusters and defining a representative network address of a current system.

3. One or more computer-readable media comprising computer-readable instructions thereon which, when executed by a computer, perform a method for providing an integrated scheduling of a hierarchical multimedia streaming server system to provide a multimedia streaming service on a two-level double cluster system, comprising the steps of:

determining whether a system configuration mode of a current system is a two-level double cluster based system configuration mode;

if the system configuration mode of the current system is not the two-level double cluster based system configuration mode, determining whether the system configuration mode of the current system is a mono-level single virtual cluster based system configuration mode;

if the system configuration mode of the current system is the mono-level single virtual cluster based system configuration mode, performing a scheduling function for a mono-level virtual cluster based multimedia streaming server system including one virtual dispatcher node and multiple virtual server nodes; and if the system configuration mode of the current system is not the mono-level single virtual cluster based system configuration mode, performing a scheduling function for a single virtual server node based multimedia streaming server system according to the system configuration mode of the current system and a representative network address of the current system, wherein depending on a scale and a characteristic of the multimedia streaming service, the hierarchical multimedia streaming server system is configured into a single virtual server node based system, which is a minimum-scale, a mono-level single virtual cluster based system, which is a medium-scale, and a two-level double cluster based system, which is a maximum-scale and the integrated scheduling can be commonly used under each of the system configurations to provide the multimedia streaming service, and wherein performing the scheduling function for the mono-level virtual cluster based multimedia streaming server system includes:

receiving an initial request related to a streaming service from a multimedia stream reproducing block through the virtual dispatcher node;

analyzing the request and checking whether there is an available virtual server node storing a corresponding multimedia file;

determining whether the available virtual server node exists;

if the available virtual server node exists, determining whether there are multiple available virtual server nodes;

if the multiple available virtual server nodes exist, analyzing resource states of multiple available virtual servers and selecting an optimum virtual server node;

notifying a network address of the selected virtual server node to the multimedia stream reproducing block through the virtual dispatcher node;

awaiting a request related to the streaming service from the multimedia stream reproducing block; and transmitting a multimedia stream data to the multimedia stream reproducing block from the selected virtual server node when receiving the request from the multimedia stream reproducing block.

4. The computer-readable media of claim 3, wherein the step of performing the scheduling function for the single virtual server node based multimedia streaming server system includes the steps of: receiving a request related to a streaming service from a multimedia stream reproducing block through a virtual server node; analyzing the request from the multimedia stream reproducing block and checking whether the virtual server node stores a requested multimedia file; determining whether the virtual server node stores the requested multimedia file; and if the virtual server node stores the requested multimedia file, transmitting a multimedia stream data to the multimedia stream reproducing block from the virtual server node.

5. The computer-readable media of claim 4, further including, at the step of determining whether the virtual server node stores the requested multimedia file, if the virtual server node does not store the requested multimedia file, the step of notifying the multimedia stream reproducing block that the streaming service is unavailable through the virtual server node.

6. The computer-readable media claim 3, wherein performing the scheduling function for the mono-level virtual cluster based multimedia streaming server system further includes, at the step of determining whether the available virtual server node exists, if the available virtual server node does not exist, the step of notifying the multimedia stream reproducing block that the streaming service is unavailable through the virtual server node and terminating the scheduling function.

7. The computer-readable media of claim 3, wherein performing the scheduling function for the mono-level virtual cluster based multimedia streaming server system further includes, at the step of determining whether the multiple available virtual server nodes exist, if the multiple available virtual server nodes do not exist, the step of notifying a network address of the selected virtual server node to the multimedia stream reproducing block through the virtual dispatcher node and returning to the step of awaiting the request from the multimedia stream reproducing block.

8. The computer-readable media of claim 3, wherein performing the scheduling function for the mono-level virtual cluster based multimedia streaming server system includes, the step of receiving the initial request and the step of notifying the network address are carried out using an initial path to provide the requested service; the step of transmitting the multimedia stream data is carried out using a redirected path to provide the requested service; and the initial path and the redirected path are activated sequentially.

9. The computer-readable media of claim 6, wherein the step of notifying that the requested streaming service is unavailable is carried out using the initial path to provide the requested service.

10. The computer-readable media of claim 7, wherein the step of notifying the network address is carried out using the initial path to provide the requested service.

11. The computer-readable media of claim 3, further including, at the step of determining the system configuration mode of the current system is the two-level double cluster based system configuration mode, if the system configuration mode of the current system is the two-level double cluster based system configuration mode, the step of performing a scheduling for a two-level double cluster based multimedia streaming server system including one dispatcher node and multiple server nodes/mono-level virtual clusters.

12. The computer-readable media of claim 11, further including, prior to performing the scheduling function for the two-level double cluster based multimedia streaming server system, the step of: exchanging information between cluster nodes in the two-level double cluster based multimedia streaming server system configured through; configuring a mono-level virtual cluster on a single server node; and collecting multiple server nodes based on the mono-level virtual cluster into several bundles.

13. The computer-readable media of claim 12, wherein the step of exchanging the information between the cluster nodes includes the steps of: reporting a current state by performing a first collection operation by checking states of virtual server nodes including a work load state and an operation state in each of the mono-level virtual cluster based multimedia streaming server nodes and then performing a second collection operation by periodically reporting the checked states to a dispatcher node of the two-level double cluster based multimedia streaming server system through corresponding virtual dispatcher nodes; and reporting information on retention of multimedia files by performing another first collection operation by checking multimedia files retained by the virtual server nodes of each of the mono-level virtual cluster based multimedia steaming server nodes and then performing another second collection operation by making a report whenever information is changed to the dispatcher node of the two-level double cluster based multimedia streaming server system through the corresponding virtual dispatcher nodes.

* * * * *